L. Schulze,
Spirit Meter.
No. 106,081. Patented Aug. 2, 1870.
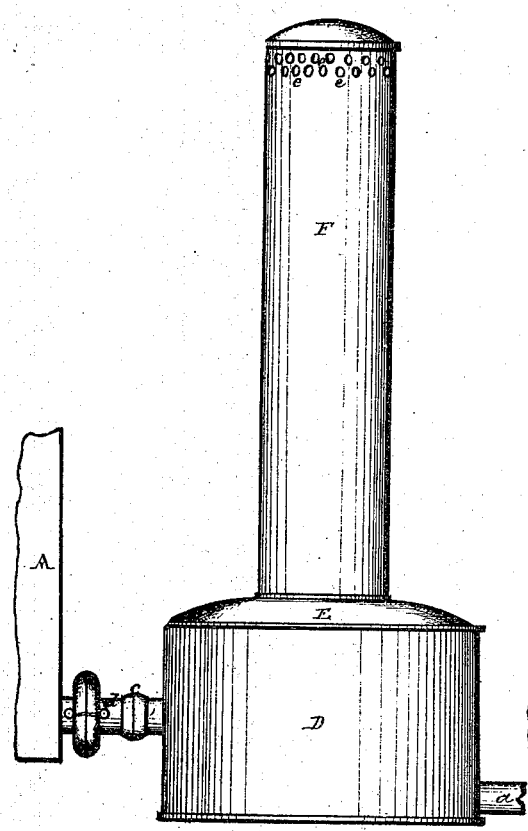
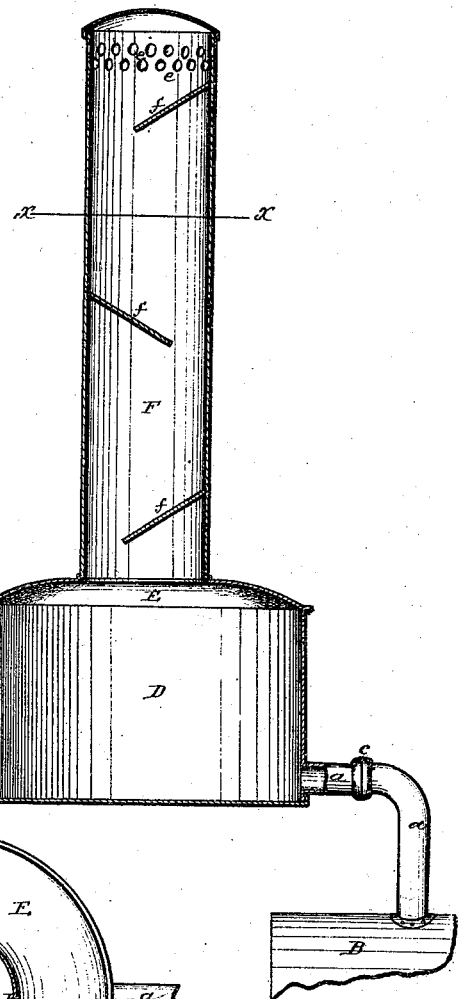
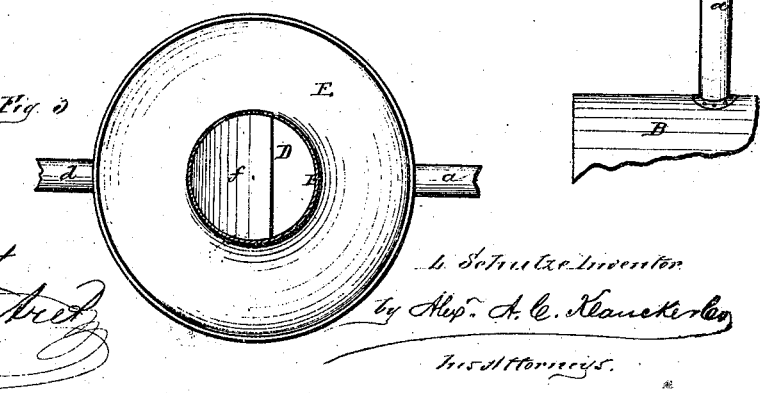

United States Patent Office.

LOUIS SCHULZE, OF LOUISVILLE, KENTUCKY.

Letters Patent No. 106,081, dated August 2, 1870.

IMPROVEMENT IN REGULATOR FOR SPIRIT-METERS.

The Schedule referred to in these Letters Patent and making part of the same.

*To all whom it may concern:*

Be it known that I, LOUIS SCHULZE, of Louisville, in the county of Jefferson and State of Kentucky, have invented a new and useful Improvement in Regulators for Spirit-Meters; and I do hereby declare the following to be a full, clear, and exact description of the same, sufficient to enable others skilled in the art to which my invention appertains to fully understand and use the same, reference being had to the accompanying drawing, which makes part of this specification, and in which—

Figure 1 is a side elevation of my improved regulator;

Figure 2 is a central vertical section of the same; and

Figure 3 is a horizontal section in line $x\ x$, fig. 2.

Like letters of reference indicate corresponding parts in the several figures.

My invention consists in the application of a large reservoir to the bottom of the vent-pipe, through which latter the steam and hot-air can escape as the low-wine passes from the worm-tub to the meter; the said reservoir serving to allow the low-wine on this passage to throw off any pressure, so that it will flow evenly through the meter without any more pressure than its own weight.

The vent-pipes now in use rise directly from the pipe which connects the worm-tub to the meter, and the low-wine, in passing through this pipe under an enormous pressure and at a great speed, has only time to throw off a portion of the pressure, the greater part of which latter is still exerted on the scales of the meter; the fluid strikes the scale not by its own weight merely, but under this pressure, which depresses the scale, and causes the indicator to indicate more than actually has passed through the scale. By the use of my reservoir, however, the low-wine has time to settle quietly, and to flow from the reservoir to the meter in an unbroken even flow, no pressure beyond its weight being exerted on the scale.

A in the drawing may represent the worm-tub, and B, the meter.

F is the vent-pipe now in common use, provided with inclining shelves, $f$, alternately, at opposite sides, and having small openings, $e$, formed at the top, through which the steam and hot air escape.

Instead of placing this vent-pipe directly on the pipe leading from the worm-tub to the meter, I connect its lower part in any suitable manner to the top E of the reservoir D.

This reservoir D I connect to the worm-tub A by means of a small pipe, $d$, which enters the reservoir near its top, or at a suitable distance from its bottom, as circumstances may require.

A short pipe, $a$, extends from near the bottom of the reservoir opposite to where the pipe $d$ enters the same, and connects the reservoir with the meter.

Both pipes $d$ and $a$ may be made in two parts, to facilitate the removal or attachment of the regulator, the connection being protected by a capsule constructed so as to be readily sealed.

Permanent connections of said pipes, if made in several parts, such as shown at $c$, may be stamped on the entire circumference, to guard against their being tampered with.

As the low-wine passes from the worm-tub, under great pressure, into the reservoir, the latter gradually fills, and arrests the speed of the flow of the liquid which is thus allowed to settle, the steam and hot air which create the pressure of the flow, escaping through the vent-pipe F; the low-wine being prevented from passing out of the said vent-pipe, as it occasionally rises in the same, by means of inclined shelves $f$.

By this means the liquid will flow from the reservoir to the meter in an unbroken, quiet, even flow, no matter under how much pressure it enters the reservoir.

It is not essential that the bottom of the reservoir should be made straight, as shown in the drawing, as, in large distilleries where the pressure is very great, it will be found that a concave bottom will arrest the great speed of the inflowing liquid.

In this case the pipe $a$ may extend into the reservoir, and be bent slightly downward.

I am well aware that the vent-pipe F is now in common use, and this I do not claim; but What I do claim as my invention, and desire to secure by Letters Patent, is—

1. The reservoir D, when applied to regulating vent-pipes of regulators for spirit-meters, substantially as herein described.

2. The combination, with the vent-pipe F, of the reservoir D, and pipes $d\ a$, substantially as and for the purpose described.

LOUIS SCHULZE.

Witnesses:
MARTIN MILLER,
SAML. RISLEY.